US012586385B2

(12) United States Patent
Chen et al.

(10) Patent No.: US 12,586,385 B2
(45) Date of Patent: Mar. 24, 2026

(54) SYSTEM AND METHOD FOR OCCLUSION DETECTION IN AUTONOMOUS VEHICLE OPERATION

(71) Applicant: TuSimple, Inc., San Diego, CA (US)

(72) Inventors: Zhe Chen, San Diego, CA (US); Yizhe Zhao, San Diego, CA (US); Lingting Ge, San Diego, CA (US); Panqu Wang, San Diego, CA (US)

(73) Assignee: CreateAI, Inc., San Diego, CA (US)

( * ) Notice: Subject to any disclaimer, the term of this patent is extended or adjusted under 35 U.S.C. 154(b) by 273 days.

(21) Appl. No.: 18/475,647

(22) Filed: Sep. 27, 2023

(65) Prior Publication Data

US 2024/0265710 A1     Aug. 8, 2024

Related U.S. Application Data

(60) Provisional application No. 63/483,489, filed on Feb. 6, 2023.

(51) Int. Cl.
| | |
|---|---|
| *G06V 20/58* | (2022.01) |
| *B60W 60/00* | (2020.01) |
| *G06T 7/246* | (2017.01) |
| *G06T 7/73* | (2017.01) |
(Continued)

(52) U.S. Cl.
CPC ........... *G06V 20/58* (2022.01); *B60W 60/001* (2020.02); *G06T 7/248* (2017.01); *G06T 7/74* (2017.01); *G06V 10/776* (2022.01); *G06V 10/87* (2022.01); *B60W 2420/403* (2013.01); *B60W 2552/15* (2020.02); *B60W 2556/40* (2020.02); *B60W 2720/10* (2013.01); *G06T 2207/30252* (2013.01)

(58) Field of Classification Search
CPC ...... G06V 20/58; G06V 10/776; G06V 10/87; G06V 20/56; B60W 60/001; B60W 2420/403; B60W 2552/15; B60W 2556/40; B60W 2720/10; G06T 7/248; G06T 7/70; G06T 7/74; G06T 2207/30252; G06T 2207/10016; G06T 7/00; G06T 2207/10024
USPC ........................................................ 382/103
See application file for complete search history.

(56) References Cited

U.S. PATENT DOCUMENTS

| | | | | |
|---|---|---|---|---|
| 11,741,709 B2 * | 8/2023 | Korjus et al. | .......... | G06V 20/38 |
| 2015/0028741 A1 | 1/2015 | Schmidt et al. | | |
| 2017/0327035 A1 * | 11/2017 | Keiser | .................. | B60Q 9/008 |
(Continued)

*Primary Examiner* — Matthew C Bella
*Assistant Examiner* — Daniel Joseph Santos
(74) *Attorney, Agent, or Firm* — Perkins Coie LLP

(57) ABSTRACT
The present disclosure provides methods and systems for operating an autonomous vehicle. In some embodiments, the system may obtain, by a camera associated with an autonomous vehicle, an image of an environment of the autonomous vehicle, the environment including a road on which the autonomous vehicle is operating and an occlusion on the road. The system may identify the occlusion in the image based on map information of the environment and at least one camera parameter of the camera for obtaining the image. The system may identify an object represented in the image, and determine a confidence score relating to the object. The confidence score may indicate a likelihood a representation of the object in the image is impacted by the occlusion. The system may determine an operation algorithm based on the confidence score; and cause the autonomous vehicle to operate based on the operation algorithm.

20 Claims, 8 Drawing Sheets

(51) Int. Cl.
    *G06V 10/70*        (2022.01)
    *G06V 10/776*      (2022.01)

(56)             References Cited

U.S. PATENT DOCUMENTS

| | | | |
|---|---|---|---|
| 2018/0150082 A1* | 5/2018 | Jang | G05D 1/0246 |
| 2019/0272433 A1* | 9/2019 | Yu et al. | G06K 9/00791 |
| 2022/0111848 A1* | 4/2022 | Parks et al. | B60W 30/18163 |
| 2024/0087333 A1* | 3/2024 | Hari et al. | G06V 20/58 |
| 2024/0111308 A1* | 4/2024 | Shokri et al. | G05D 1/622 |

* cited by examiner

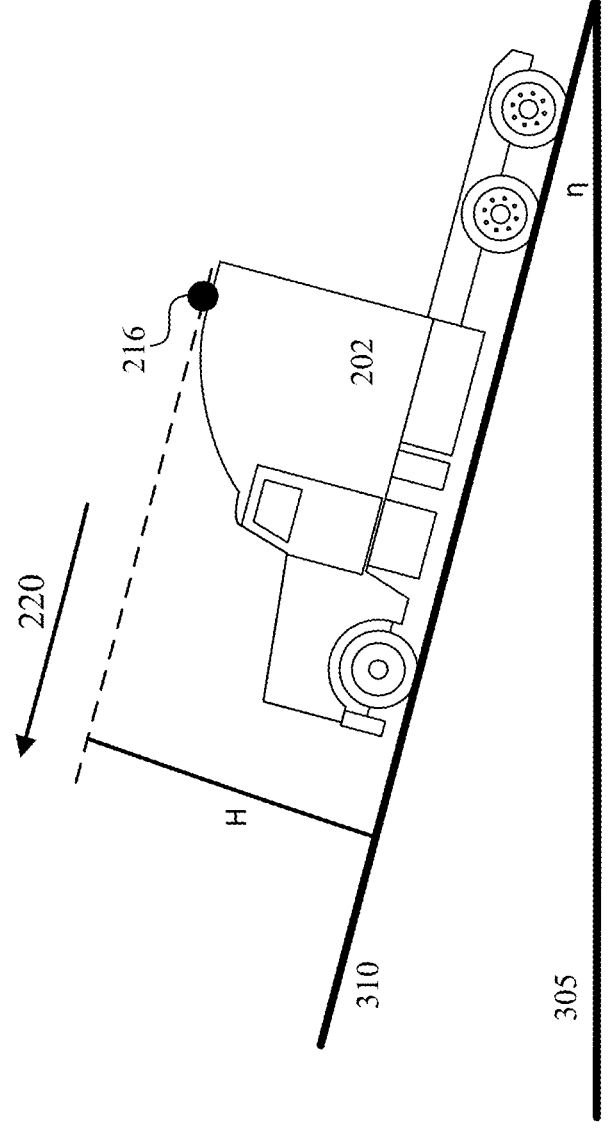
*FIG. 3*

Obtaining an image of an environment of the autonomous vehicle, the environment including a road on which the autonomous vehicle is operating and an occlusion on the road
402

Identifying the occlusion in the image based on map information of the environment and at least one imaging parameter of the camera for obtaining the image
404

Identifying an object represented in the image
406

Determining a confidence score relating to the object, wherein the confidence score indicates a likelihood a representation of the object in the image is impacted by the occlusion
408

Determining an operation algorithm based on the confidence score
410

Causing the autonomous vehicle to operate based on the operation algorithm
412

*FIG. 4*

SYSTEM AND METHOD FOR OCCLUSION DETECTION IN AUTONOMOUS VEHICLE OPERATION

CROSS-REFERENCE TO RELATED APPLICATIONS

This patent application claims priority to and the benefit of U.S. Provisional Application No. 63/483,489, filed on Feb. 6, 2023. The contents of the aforementioned application are incorporated herein by reference in its entirety.

TECHNICAL FIELD

This document describes techniques for occlusion detection in autonomous driving.

BACKGROUND

A vehicle may include sensors such as cameras attached to the vehicle for several purposes. For example, cameras may be attached to a roof of the vehicle for security purposes, for driving aid, or for facilitating autonomous driving. The sensors mounted on a vehicle can obtain sensor data (e.g., images) of one or more areas surrounding the vehicle. The sensor data can be processed to obtain information about the road or about the objects surrounding the vehicle. For example, images obtained by a camera can be analyzed to determine distances of objects surrounding the autonomous vehicle so that the autonomous vehicle can be safely maneuvered around the objects.

SUMMARY

Autonomous driving technology can enable a vehicle to perform autonomous driving operations by determining characteristics of an environment of the vehicle including the road, an object located on the road, etc. One or more computers located in the vehicle can determine the characteristics of the road and/or objects on the road by performing signal processing on sensor data provided by sensors located on or in the vehicle, where the sensors may include cameras. The accuracy and/or efficiency for the one or more computers to assess the environment and determine and control the vehicle's operations accordingly depends at least in part on the availability and/or accuracy of the sensor data, and accurate interpretation of the sensor data.

An aspect of the present disclosure relates to a method of autonomous vehicle operation. The method includes: obtaining, by a camera associated with an autonomous vehicle, an image of an environment of the autonomous vehicle, the environment including a road on which the autonomous vehicle is operating and an occlusion on the road; identifying, by at least one processor associated with the autonomous vehicle, the occlusion in the image based on map information of the environment and at least one camera parameter of the camera for obtaining the image; identifying, by the at least one processor, an object represented in the image; determining, by the at least one processor, a confidence score relating to the object, wherein the confidence score indicates a likelihood a representation of the object in the image is impacted by the occlusion; determining an operation algorithm based on the confidence score; and causing the autonomous vehicle to operate based on the operation algorithm.

In some embodiments, the at least one camera parameter of the camera includes at least one of an intrinsic camera parameter of the camera or an extrinsic camera parameter of the camera. For instance, the at least one camera parameter of the camera includes at least one of a height of the camera or a tilt angle of the camera.

In some embodiments, the image includes a reference line relating to the at least one parameter of the camera. For instance, the at least one processor associated with an autonomous vehicle projects a reference line to the image, originating from a point corresponding to the position of the camera, to a point forward.

In some embodiments, the map information includes a contour of the road. To identify the occlusion in the image based on map information of the environment and at least one parameter of the camera, the at least one processor may determine, at each of a plurality of points along the reference line, a distance between the point on the reference line and a corresponding location on the contour of the road; and identify a location of the occlusion based on the distances. In some embodiments, the at least one processor marks the identified occlusion in the image.

In some embodiments, the map information includes a contour of the road, and the occlusion includes a change in the contour of the road in an occlusion direction. To identify an object represented in the image, the at least one processor may determine a bounding box that encloses a representation of the object in the image. The at least one processor may determine a confidence score relating to the object by determining a distance between the bounding box and the occlusion marked in the image along the occlusion direction; and determining the confidence score based on the distance. In some embodiments, the at least one processor may determine a distance between the bounding box and the occlusion marked in the image along the occlusion direction comprises by determining a pixel count of pixels along a line connecting a reference point of the bounding box and the occlusion marked in the image along the occlusion direction. Merely by way of example, the reference point of the bounding box is a center of the bounding box.

In some embodiments, the occlusion direction of the occlusion is a vertical direction substantially perpendicular to a plane of the road. In some embodiments, the occlusion direction is a lateral direction substantially in or parallel to a plane of the road.

In some embodiments, in response to determining that the confidence score relating to the object is below a confidence score threshold, the at least one processor maintains the operation algorithm currently in effect.

In some embodiments, in response to determining that the confidence score exceeds a confidence score threshold, the at least one processor adjusts the operation algorithm currently in effect. In some embodiments, the at least one processor adjusts the operation algorithm currently in effect by decelerating the speed of the autonomous vehicle. Merely by way of example, if the autonomous vehicle travels at a first speed when the autonomous vehicle operates according to the operation algorithm currently in effect and travels at a second speed when operating according to the adjusted operation algorithm, the first speed is greater than the second speed. In some embodiments, the at least one processor adjusts the operation algorithm currently in effect by selecting, based on the confidence score, an object detection model used for identifying the object in the image. Merely by way of example, the at least one processor obtains, using the camera, a first image at a first image at a first time point and a second image of the environment at a second time point different from the first time point; the at least one processor identifies the object in the first image based on a first object detection model, and in response to determining that the confidence score relating to the object determined based on the first image exceeds a confidence score threshold, the at least one processor selects a second object detection model for identifying the object in the second image, in which the second object detection model is different from the first object detection model.

In some embodiments, the at least one processor obtains, using the camera, a plurality of images of the environment at a plurality of time points; tracks the object based on the plurality of images; and determines the operation algorithm based on the tracking of the object, instead of or in addition to the confidence score.

An aspect of the present disclosure relates to an apparatus, including at least one processor and at least one memory including computer program code which, when executed by the at least one processor, cause the apparatus to perform steps for autonomous vehicle operation herein. In some embodiments, the apparatus may include a camera that is attached to a top surface of the autonomous vehicle for acquiring an image of an environment of the autonomous vehicle. In some embodiments, at least one of the at least one processor is installed in the autonomous vehicle.

An aspect of the present disclosure relates to an autonomous vehicle, including at least one camera, at least one processor, and memory that includes computer program code which, when executed by the at least one processor, cause the autonomous vehicle to operate according to any one of the methods herein. In some embodiments, at least one of the at least one camera is attached to a top surface of the autonomous vehicle.

An aspect of the present disclosure relates to a non-transitory computer readable medium, which, when executed by at least one processor, cause a system or an autonomous vehicle to operation according to any one of the methods described herein.

The above and other aspects and their implementations are described in greater detail in the drawings, the descriptions, and the claims.

BRIEF DESCRIPTION OF THE DRAWINGS

FIG. 3 shows a side view of an autonomous vehicle travelling on a slope.

FIG. 4 shows a flowchart of an example process for operating an autonomous vehicle.

Like reference numerals indicate like components or operations.

DETAILED DESCRIPTION

An autonomous vehicle may include sensors such as cameras and Light Detection and Ranging (LiDARs) mounted on the autonomous vehicle to obtain sensor data.

The sensor data can be obtained and analyzed by one or more computers on-board the autonomous vehicle to determine characteristics of objects (e.g., vehicles or pedestrians) surrounding the autonomous vehicle on the road. The characteristics of the object may include a distance of the object from the autonomous vehicle and/or speed of the object. The computer(s) located in the autonomous vehicle can perform signal processing techniques on sensor data so that the computer(s) can precisely or accurately detect an object and determine its characteristics.

I. Example Vehicle Ecosystem for Autonomous Driving

Figure 1:
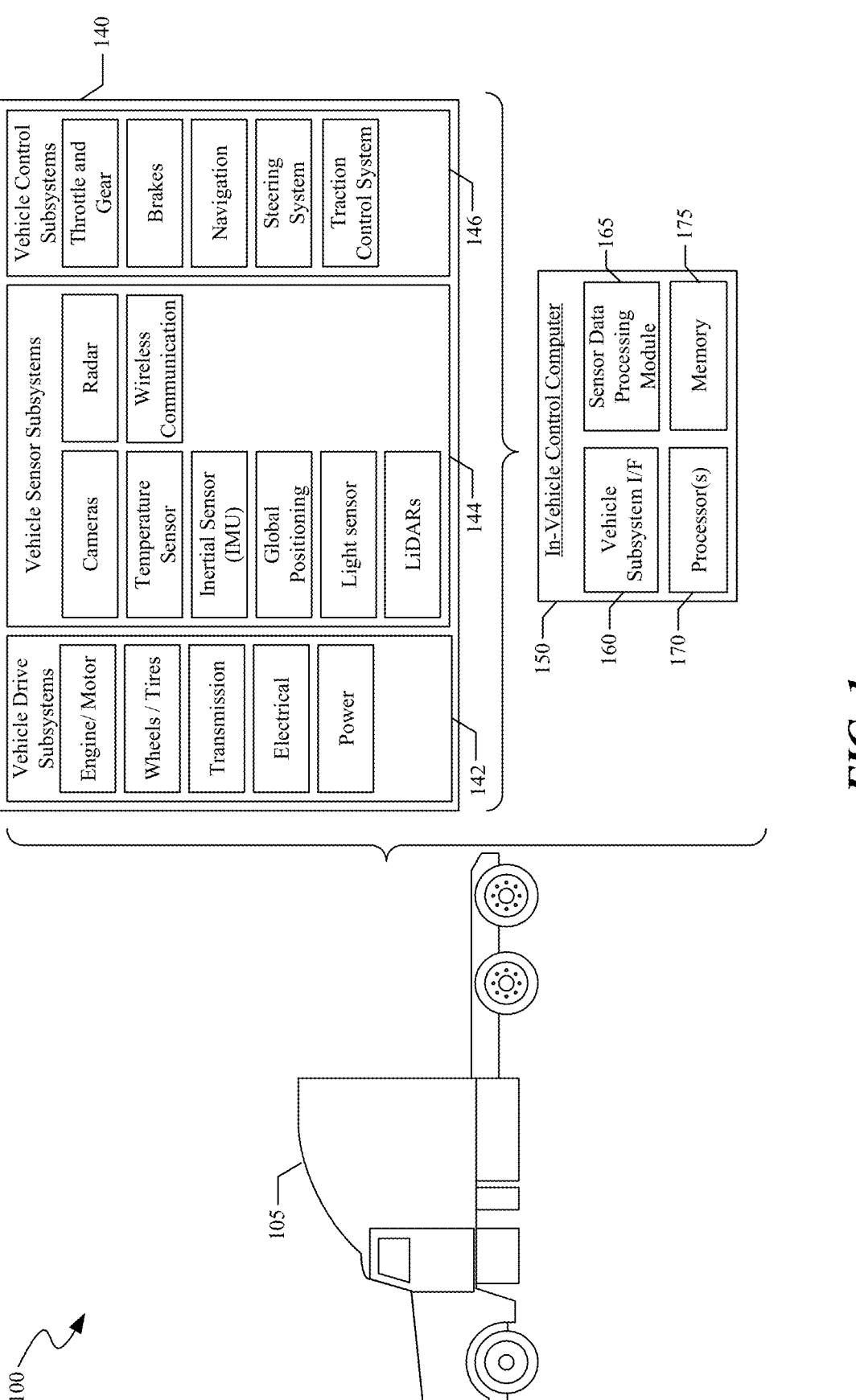
FIG. 1 shows a block diagram of an example vehicle ecosystem for autonomous driving technology.

FIG. 1 shows a block diagram of an example vehicle ecosystem 100 for autonomous driving. The vehicle ecosystem 100 may include an in-vehicle control computer 150 located in the autonomous vehicle 105. The sensor data processing module 165 of the in-vehicle control computer 150 can perform signal processing techniques on sensor data received from, e.g., one or more cameras, LiDARs, etc., on the autonomous vehicle 105 so that the signal processing techniques can provide characteristics of objects located on the road where the autonomous vehicle 105 is operated in some embodiments. The sensor data processing module 165 can use at least the information about the characteristics of the one or more objects to send instructions to one or more devices (e.g., motor in the steering system or brakes) in the autonomous vehicle 105 to steer and/or apply brakes.

As exemplified in FIG. 1, the autonomous vehicle 105 may be a semi-trailer truck. The vehicle ecosystem 100 may include several systems and components that can generate and/or deliver one or more sources of information/data and related services to the in-vehicle control computer 150 that may be located in an autonomous vehicle 105. The in-vehicle control computer 150 can be in data communication with a plurality of vehicle subsystems 140, all of which can be resident in the autonomous vehicle 105. The in-vehicle computer 150 and the plurality of vehicle subsystems 140 can be referred to as autonomous driving system (ADS). A vehicle subsystem interface 160 is provided to facilitate data communication between the in-vehicle control computer 150 and the plurality of vehicle subsystems 140. In some embodiments, the vehicle subsystem interface 160 can include a controller area network (CAN) controller to communicate with devices in the vehicle subsystems 140.

The autonomous vehicle (AV) 105 may include various vehicle subsystems that support the operation of the autonomous vehicle 105. The vehicle subsystems may include a vehicle drive subsystem 142, a vehicle sensor subsystem 144, and/or a vehicle control subsystem 146. The components or devices of the vehicle drive subsystem 142, the vehicle sensor subsystem 144, and the vehicle control subsystem 146 as shown as examples. In some embodiment, additional components or devices can be added to the various subsystems. Alternatively, in some embodiments, one or more components or devices can be removed from the various subsystems. The vehicle drive subsystem 142 may include components operable to provide powered motion for the autonomous vehicle 105. In an example embodiment, the vehicle drive subsystem 142 may include an engine or motor, wheels/tires, a transmission, an electrical subsystem, and a power source.

The vehicle sensor subsystem 144 may include a number of sensors configured to sense information about an environment in which the autonomous vehicle 105 is operating or a condition of the autonomous vehicle 105. The vehicle sensor subsystem 144 may include one or more cameras or image capture devices, one or more temperature sensors, an inertial measurement unit (IMU), a Global Positioning System (GPS) device, a plurality of LiDARs, one or more radars, and/or a wireless communication unit (e.g., a cellular communication transceiver). The vehicle sensor subsystem 144 may also include sensors configured to monitor internal systems of the autonomous vehicle 105 (e.g., an $O_2$ monitor, a fuel gauge, an engine oil temperature, etc.). In some embodiments, the vehicle sensor subsystem 144 may include sensors in addition to the sensors shown in FIG. 1.

The IMU may include any combination of sensors (e.g., accelerometers and gyroscopes) configured to sense position and orientation changes of the autonomous vehicle 105 based on inertial acceleration. The GPS device may be any sensor configured to estimate a geographic location of the autonomous vehicle 105. For this purpose, the GPS device may include a receiver/transmitter operable to provide information regarding the position of the autonomous vehicle 105 with respect to the Earth. Each of the one or more radars may represent a system that utilizes radio signals to sense objects within the environment in which the autonomous vehicle 105 is operating. In some embodiments, in addition to sensing the objects, the one or more radars may additionally be configured to sense the speed and the heading of the objects proximate to the autonomous vehicle 105. The laser range finders or LiDARs may be any sensor configured to sense objects in the environment in which the autonomous vehicle 105 is located using lasers or a light source. The cameras may include one or more cameras configured to capture a plurality of images of the environment of the autonomous vehicle 105. The cameras may be still image cameras or motion video cameras.

The vehicle control subsystem 146 may be configured to control operation of the autonomous vehicle 105 and its components. Accordingly, the vehicle control subsystem 146 may include various elements such as a throttle and gear, a brake unit, a navigation unit, a steering system and/or a traction control system. The throttle may be configured to control, for instance, the operating speed of the engine and, in turn, control the speed of the autonomous vehicle 105. The gear may be configured to control the gear selection of the transmission. The brake unit can include any combination of mechanisms configured to decelerate the autonomous vehicle 105. The brake unit can use friction to slow the wheels in a standard manner. The brake unit may include an Anti-lock brake system (ABS) that can prevent the brakes from locking up when the brakes are applied. The navigation unit may be any system configured to determine a driving path or route for the autonomous vehicle 105. The navigation unit may additionally be configured to update the driving path dynamically while the autonomous vehicle 105 is in operation. In some embodiments, the navigation unit may be configured to incorporate data from the GPS device and one or more predetermined maps so as to determine the driving path for the autonomous vehicle 105. The steering system may represent any combination of mechanisms that may be operable to adjust the heading of autonomous vehicle 105 in an autonomous mode or in a driver-controlled mode.

In FIG. 1, the vehicle control subsystem 146 may also include a traction control system (TCS). The TCS may represent a control system configured to prevent the autonomous vehicle 105 from swerving or losing control while on the road. For example, TCS may obtain signals from the IMU and the engine torque value to determine whether it should intervene and send instruction to one or more brakes on the autonomous vehicle 105 to mitigate the autonomous vehicle 105 swerving. TCS is an active vehicle safety feature designed to help vehicles make effective use of traction available on the road, for example, when accelerating on low-friction road surfaces. When a vehicle without TCS attempts to accelerate on a slippery surface like ice, snow, or loose gravel, the wheels can slip and can cause a dangerous driving situation. TCS may also be referred to as electronic stability control (ESC) system.

Many or all of the functions of the autonomous vehicle 105 can be controlled by the in-vehicle control computer 150. The in-vehicle control computer 150 may include at least one processor 170 (which can include at least one microprocessor) that executes processing instructions stored in a non-transitory computer readable medium, such as the memory 175. The in-vehicle control computer 150 may also represent a plurality of computing devices that may serve to control individual components or subsystems of the autonomous vehicle 105 in a distributed fashion. In some embodiments, the memory 175 may contain processing instructions (e.g., program logic) executable by the processor 170 to perform various methods and/or functions of the autonomous vehicle 105, including those described for the sensor data processing module 165 as explained in this patent document. For example, the processor 170 of the in-vehicle control computer 150 and may perform operations described in this patent document in, for example, FIGS. 3 and 4.

The memory 175 may contain additional instructions as well, including instructions to transmit data to, receive data from, interact with, or control one or more of the vehicle drive subsystem 142, the vehicle sensor subsystem 144, and the vehicle control subsystem 146. The in-vehicle control computer 150 may control the function of the autonomous vehicle 105 based on inputs received from various vehicle subsystems (e.g., the vehicle drive subsystem 142, the vehicle sensor subsystem 144, and the vehicle control subsystem 146).

Figure 2:
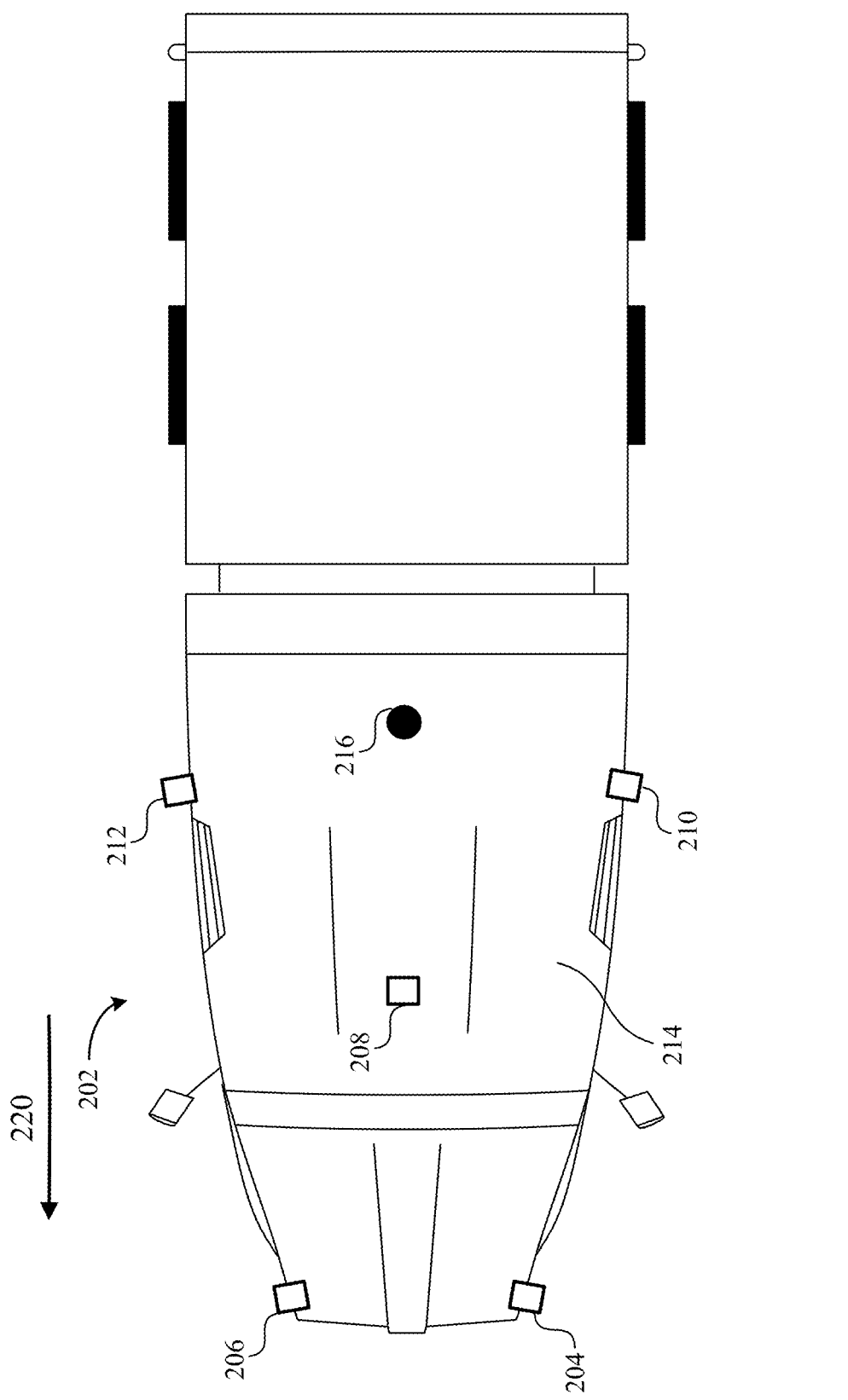
FIG. 2 shows a top view of an autonomous vehicle that includes a plurality of sensors.

FIG. 2 shows a top view of an autonomous vehicle (AV) 202 that may include a plurality of sensors including LiDARs 204 to 212 and a camera 216. The AV 202 is an example of the AV 105. The locations of the plurality of sensors illustrated in FIG. 2 are exemplary. As shown in FIG. 2, the autonomous vehicle 202 may include a tractor portion of a semi-trailer truck. The camera 216 may be coupled to a roof (or top) of a cab 214 of the autonomous vehicle 202. The plurality of LiDARs 204 to 212 may be located around most or all of the autonomous vehicle 202 so that the LiDARs can obtain sensor data from several areas in front of, next to, and/or behind the autonomous vehicle 202.

The camera 216 may rotate, in a plane parallel to a terrain surface (or road) on which the autonomous vehicle travels, by a rotation angle relative to a forward direction 220 along which the autonomous vehicle travels. The camera 216 may tilt in a vertical plane by a tilt angle relative to the forward direction 220 or tilt by a tilt angle relative to the terrain surface or road. The field of view of the camera 216 of the AV 202 may also depend on the height of the camera 216, denoted by H as illustrated in FIG. 3.

II. Example Technique for Occlusion Detection in Autonomous Driving Operation

In operation, the AV 202 may monitor its environment including, e.g., the road condition of a terrain surface (e.g., a road, 310 as illustrated in FIG. 3) on which the AV 202 travels, an object travelling in a vicinity of the AV 202 (e.g., within the field of view of the camera 216), and determine or adjust an operation parameter of the AV 202 accordingly. The AV 202 may perform the monitoring based on sensor data acquired by one or more of the plurality of the sensors 204-212 and 216 as illustrated in FIG. 2. For instance, the AV 202 may perform the monitoring based on image data acquired by the camera 216. An occlusion in the environment of the AV 202 may obstruct a portion of the environment, making it invisible from the perspective of the camera 216. For example, the occlusion may include a portion of the road whose elevation changes (e.g., a portion of the road in a vicinity of a hilltop), which may obstruct the camera 216's observation of the portion of the road and/or an object in the environment that is traversing that portion of the road. The hilltop may appear at a top of the terrain surface 310 as illustrated in FIG. 3, in which the terrain surface 310 is at an angle n with the horizontal plane 305. As another example, the occlusion may include a structure (manmade or natural including, e.g., a building, a rock) extending horizontally and obstruct from the view of the camera 216 a portion of the road behind the structure and/or an object traversing the portion of the road. Such an occlusion may adversely impact the view of the camera 216 and therefore may affect the operation parameters of the AV 202 determined based on image data the camera 216 acquires. For instance, the occlusion may cause an object to suddenly disappear and/or emerge from the perspective of the camera 216 when the object traverses a portion of the road in a vicinity of the occlusion, causing the operation parameters of the AV 202 that are determined by taking into consideration of the object unstable or inaccurate, which in turn may cause the operation of the AV 202 unstable or unsafe.

The impact of the occlusion on image acquisition using the camera 216 may relate to at least one of a parameter of the occlusion, a parameter of the object in a vicinity of the occlusion, a camera parameter, or the like, or a combination thereof. Examples of relevant parameters of the occlusion include a size or dimension of the occlusion. Examples of relevant parameters of the object include a size or dimension of the object, a location of the object relative to the occlusion, etc. In some embodiments, one or more of these parameters change as the AV 202 and/or the object move relative to the occlusion.

To address the technical issues discussed above, the present disclosure provides systems and methods for occlusion detection and adjustment of autonomous driving operation accordingly. FIG. 4 shows a flowchart of an example process for autonomous vehicle operation in accordance with some embodiments of the present disclosure.

Figure 5A:
FIG. 5A shows an example image of an environment of an autonomous vehicle.
Figure 5B:
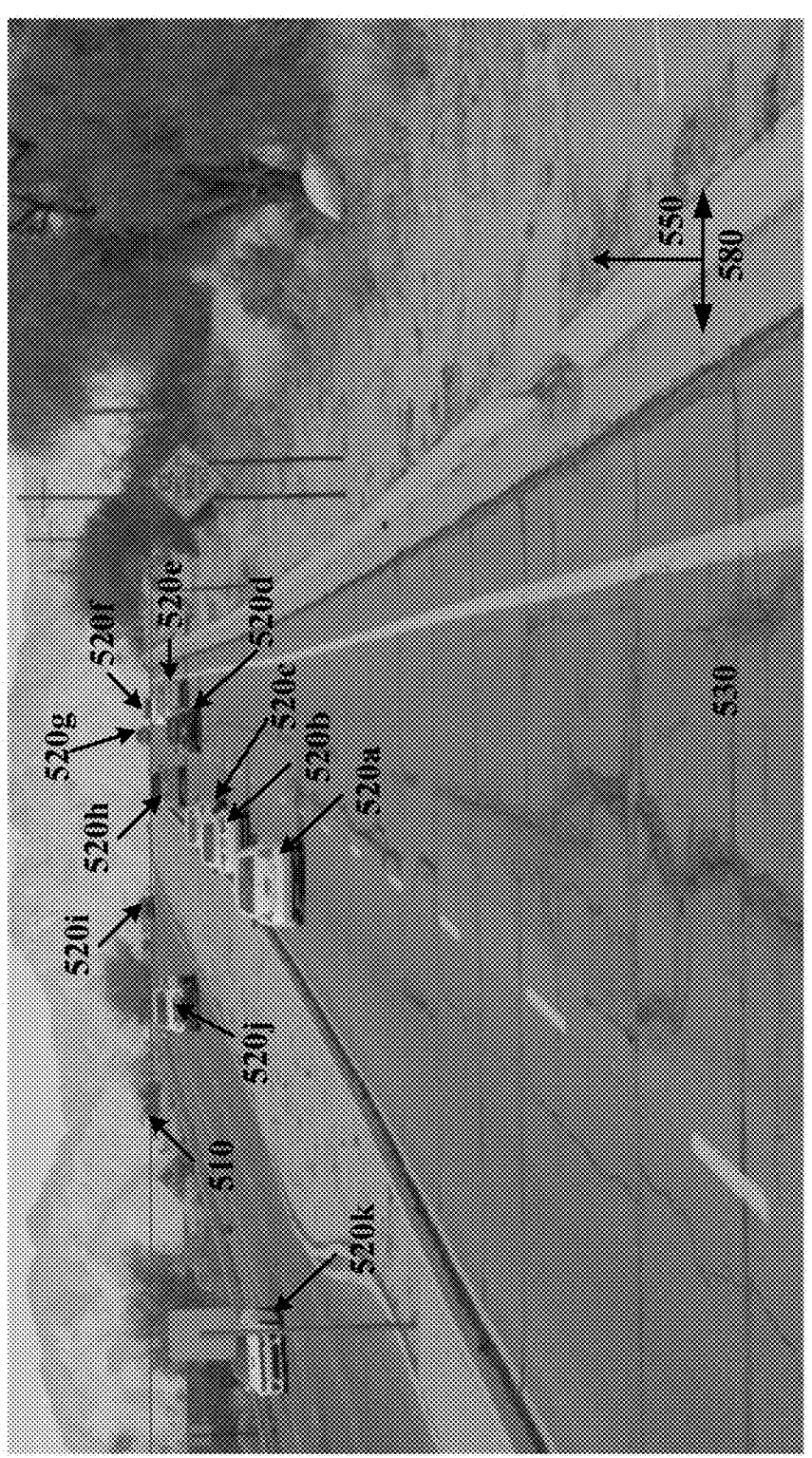
FIG. 5B shows an example image of an environment of an autonomous vehicle.
Figure 6:
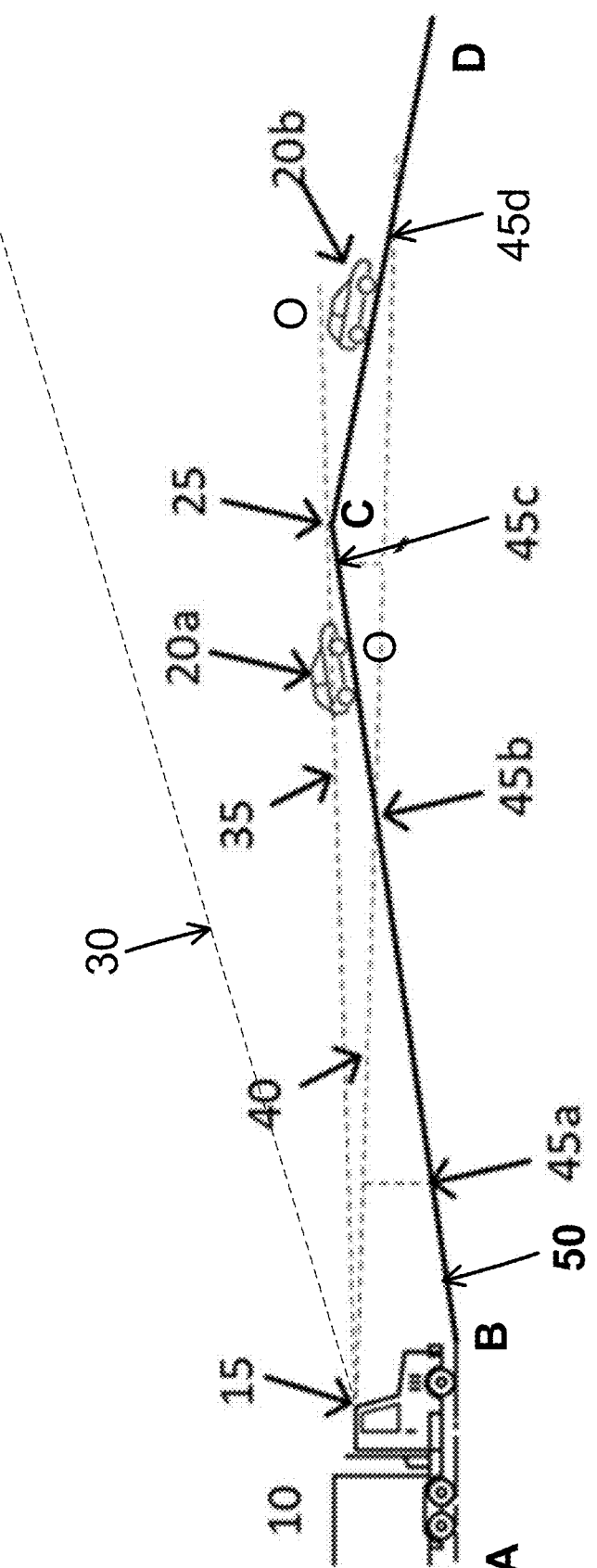
FIG. 6 shows an example method for determining a hilltop.

At 402, a camera associated with an autonomous vehicle (e.g., AV 105, AV 202, AV 10) may obtain an image of an environment of the autonomous vehicle. The environment may include a road (e.g., a road 530 as illustrated in FIG. 5A and FIG. 5B, a road 50 as illustrated in FIG. 6) on which the autonomous vehicle (e.g., an autonomous vehicle 10 as illustrated in FIG. 6) is operating and an occlusion (e.g., a hilltop 25 as illustrated in FIG. 6) on the road. The environment may also include an object (e.g., an object 520 as illustrated in FIG. 5A, any one of objects 520a, 520b, 520c, 520d, 520c, 520f, 520g, 520h, 520i, 520j, or 520k, in FIG. 5B, an object O as illustrated in FIG. 6). The image may be a 2D image. FIG. 5A provides an example image 500A of an environment of an autonomous vehicle. The environment includes a road 530 on which the autonomous vehicle is operating. The environment includes an occlusion indicated by line 510 with an occlusion direction in the vertical direction as indicated by the arrow 550. The environment may also include an object 520. FIG. 5B provides another example image 500B of an environment of an autonomous vehicle. The environment includes a road 530 on which the autonomous vehicle is operating. The environment may include an occlusion indicated by line 510 or an occlusion in the vertical direction as indicated by the arrow 550. The environment may also include objects 520a, 520b, 520c, 520d, 520c, 520f, 520g, 520h, 520i, 520j, or 520k. In some embodiments, the autonomous vehicle may track all objects in its field of view represented in the image acquired by the camera. In some embodiments, the autonomous vehicle may track a portion of the objects in its field of view represented in the image acquired by the camera. For example, the autonomous vehicle may track objects moving along a same direction (on a same side of a median strip as the autonomous vehicle) that are represented in the image acquired by the camera. As another example, the autonomous vehicle may track objects within a distance threshold along a direction (e.g., within 30 meters from the autonomous vehicle in the lateral direction as indicated by an arrow 580 in FIG. 5B) that are represented in the image acquired by the camera while the field of view of the camera in the lateral direction is 50 meters.

At 404, a computer associated with the autonomous vehicle, e.g., the in-vehicle control computer 150, may identify the occlusion in the image based on map information of the environment and at least one camera parameter of the camera for obtaining the image. In some embodiments, the computer may detect the occlusion based on the map information of the environment and at least one camera parameter of the camera for obtaining the image, and then mark the detected occlusion in the image. For instance, the computer may draw a line in the image to indicate a location of the occlusion relative to the location of the object in the image. Sec, e.g., line 510 in FIG. 5A and FIG. 5B. As the monitoring of the object is performed while at least one of the autonomous vehicle or the object is moving, the computer needs to identify the occlusion in the image substantially in real time (to facilitate timely downstream analysis) so as to allow the operation of the autonomous vehicle to proceed or be adjusted by taking into consideration of the object in a timely manner. As used herein, "substantially in real time" indicates that the computer may perform the process 400 from obtaining the image to making a decision regarding the operation algorithm of the autonomous vehicle within a period of a fraction of a second, e.g., in the order of milliseconds. Merely by way of example, the computer may perform the process 400 from obtaining the image to making a decision regarding the operation algorithm of the autonomous vehicle within a period less than 1 second, 800 milliseconds, 600 milliseconds, or 500 milliseconds, or 400 milliseconds, or 200 milliseconds, or 100 milliseconds, or 80 milliseconds, or 60 milliseconds, or 50 milliseconds, or less.

Example map information may include a contour of the road. In some embodiments, the occlusion may include a change in the contour of the road in an occlusion direction. For example, the change in the contour of the road may affect the visibility of the object from the camera's perspective.

Examples of relevant camera parameters of the camera include an intrinsic camera parameter or an extrinsic camera parameter of the camera at the time when the image is captured. As used herein, an intrinsic camera parameter refers to a camera parameter that can be adjusted independent of the autonomous vehicle, including, e.g., a structural parameter or an operation parameter of autonomous vehicle. Example intrinsic camera parameters include the focal length, etc. As used herein, an extrinsic camera parameter refers to a camera parameter that relates to or depends on a parameter of the AV 202 including, e.g., a structural parameter or an operation parameter of autonomous vehicle.

Example extrinsic camera parameters include position information of the camera which in turn may include, e.g., the height of the camera (e.g., measured from the road as illustrated as H in FIG. 3), a rotation angle, a tile angle, etc.

FIG. 6 illustrates an example process for identifying the occlusion in the image. The AV 10 (an example of the AV 105) may include a camera 15 (an example of the camera 216). The AV 10 travels on a terrain surface (or road) 50. The elevation changes over the terrain surface 50. Section AB of the terrain surface 50 is substantially horizontal (parallel to the horizon); the elevation of the terrain surface 50 increases over section BC; the elevation of the terrain surface 50 decreases over section CD. The computer associated with the autonomous vehicle may project one or more reference lines from a point corresponding to the position of the camera to a point ahead of the autonomous vehicle. Accordingly, position information of the camera relative to the AV 10 is embedded in such a reference line and facilitates the occlusion detection. Example position information of the camera relative to the AV 10 may include the height of the camera, the camera rotation information (including, e.g., yaw, pitch, roll, etc.), or the like, or a combination thereof. One or both of the point corresponding to the position of the camera and the point ahead of the autonomous vehicle may be a point in the three-dimensional space in which three-dimensional position information is embedded. Accordingly, a reference line connecting the position of the camera and the point ahead of the autonomous vehicle may include three-dimensional position information. Such a refence line may be projected to a two-dimensional plane (e.g., a plane as illustrated in FIG. 6) to facilitate the occlusion detection based on the map information and the camera parameter(s) as described elsewhere in the present disclosure. Merely by way of example, FIG. 6 shows three references lines illustrated by dashed lines 30, 35, and 40. Along each of the one or more reference lines, the computer may determine distances between multiple points along the reference line and the contour of the road 50.

As used herein, a distance between the reference line and a road 50 at a point on the road 50 may be a distance between the point on the road 50 and a corresponding point on the reference line. For instance, for an occlusion including a hilltop caused by a change in the elevation of the road, the computer may project the contour of the road 50 onto a vertical plane in which the projected contour of the road 50 illustrates the change in the elevation of the road 50. The computer may determine a distance between the reference line and the projected contour of the road 50 by determining a distance between each pair of multiple pairs of corresponding points on the reference line and the projected contour of the road 50, respectively. As used herein, a point on the reference line and a point on the projected contour of the road 50 are considered corresponding to each other if a line connecting the two points is perpendicular to the horizontal plane.

Figure 7A:
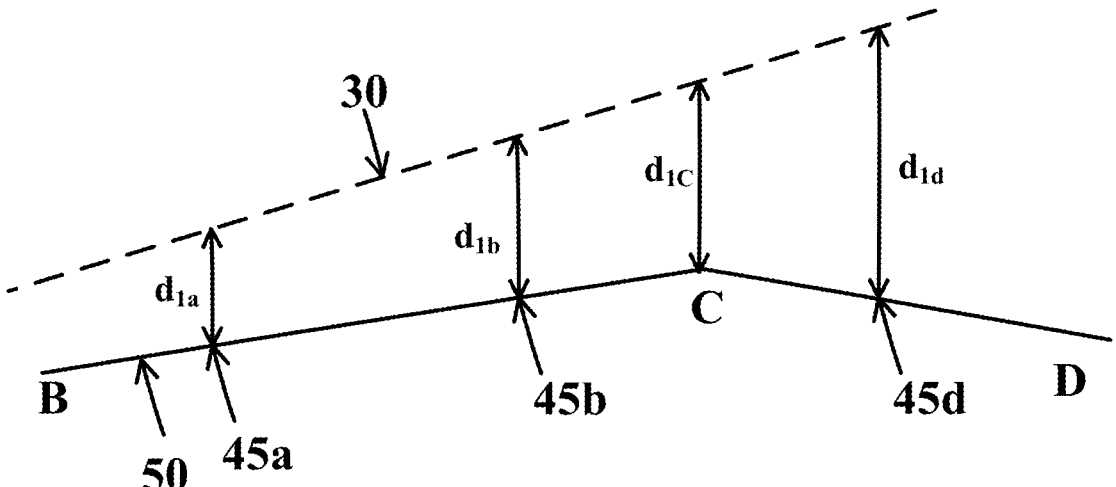
FIGS. 7A-7C show examples of hilltop detection with respect to a road using reference lines as illustrated in FIG. 6.

For example, as illustrated in FIG. 6 and FIG. 7A, the computer determines distances $d_{1a}$, $d_{1b}$, $d_{1c}$, and $d_{1d}$ between each of multiple points including 45a, 45b, 45c, and 45d of the road 50 and the respective corresponding points on the reference line 30. As illustrated, the distances including and exemplified by $d_{1a}$, $d_{1b}$, $d_{1c}$, and $d_{1d}$ remain the same or change gradually (depending on the slope of the reference line 30 compared to the slope of section BC of the road 50) in section BC, the trend of the distances changes at point C of the road 50, and then the distances increase in section CD of the road 50. At all the points along the road 50 as illustrated, the distances have positive values. Accordingly, the computer cannot find the hilltop at point C based on the reference line 30 that is always above and does not pick up information regarding the hilltop 25.

Figure 7B:
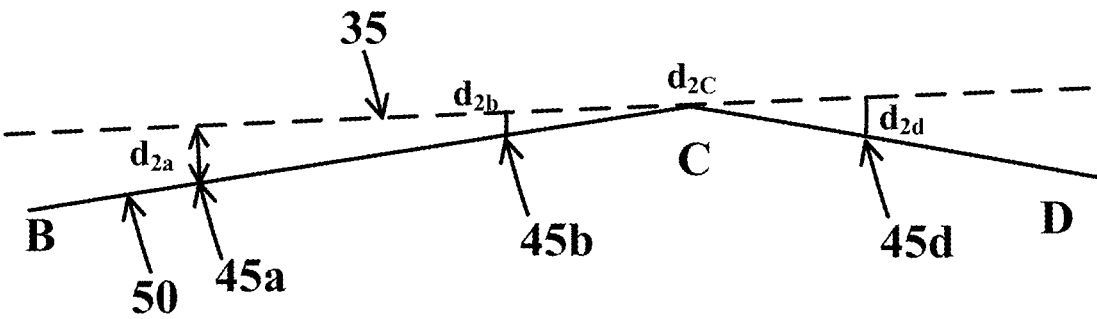

As another example, as illustrated in FIG. 6 and FIG. 7B, the computer determines distances $d_{2a}$, $d_{2b}$, $d_{2c}$, and $d_{2a}$ between each of multiple points including 45a, 45b, 45c, and 45d of the road 50 and the respective corresponding points on the reference line 35. As illustrated, the distances including and exemplified by $d_{2a}$, $d_{2b}$, $d_{2c}$, and $d_{2a}$ decrease gradually in section BC, becomes zero at point C, and then increase in section CD of the road 50. At all the points along the road 50, the distances have positive values except at point C where the distance is zero. Accordingly, the computer determines that point C is the hilltop 25.

Figure 7C:
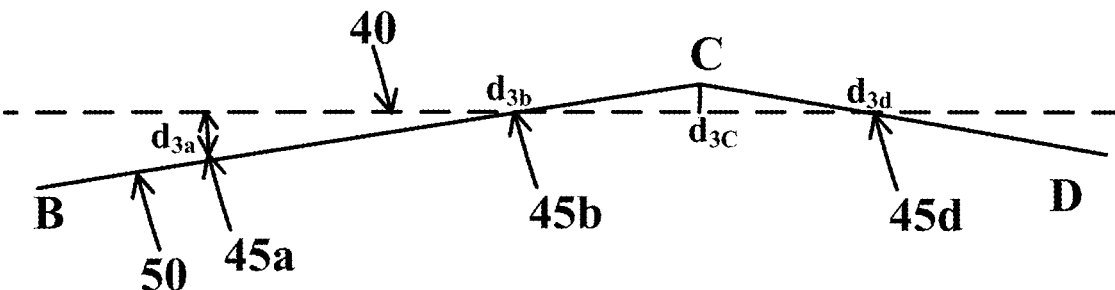

As a further example, as illustrated in FIG. 6 and FIG. 7C, the computer determines distances $d_{3a}$, $d_{3b}$, $d_{3c}$, and $d_{3d}$ between each of multiple points including 45a, 45b, 45c, and 45d of the road 50 and the respective corresponding points on the reference line 40. As illustrated, the distances including and exemplified by $d_{3a}$, $d_{3b}$, $d_{3c}$, and $d_{3d}$ decrease gradually in a first portion of section BC, equal zero at points 45b and 45d, and remain negative at various points of between points 45b and 45d of the road 50 including at point C. There is a portion of the road 50 where the elevation of the road is large and the distances have negative values. Accordingly, the computer cannot find the hilltop at point C based on the reference line 40 that is always below and does not pick up information regarding the hilltop 25.

As a still further example, the computer projects multiple reference lines 30, 35, and 40 from a point corresponding to the position of the camera to a point ahead of the autonomous vehicle, and finds the hilltop 25 based on the reference line 35 by determining distances between the reference line 35 and the road 50, and discards the distances between the reference line 30 and the road 50 and also discards the distances between the reference line 40 and the road 50. In some embodiments, the distances between each of multiple points of the road 50 and the respective corresponding points on a reference line may assist the computer to generate a next reference line that may traverse the occlusion to improve the efficiency of the occlusion detection. Merely by way of example with reference to the examples illustrated in FIGS. 4, 6, and 7A-7C, the computer may first project the reference line 30, and find that the distances including and exemplified by $d_{1a}$, $d_{1b}$, $d_{1e}$, and $d_{1d}$ are all positive as described above; the computer may then project the reference line 40, and find that the distances including and exemplified by $d_{3a}$, $d_{3b}$, $d_{3c}$, and $d_{3d}$ include positive values and also negative values as described above; the computer may project the reference line 35 that is between the reference lines 30 and 40 and traverses the hilltop 25, and determine the hilltop 25 based on the reference line 35.

FIG. 6 also shows an object O in a vicinity of the hilltop 25. The observation or monitoring of the object O by the camera may be obstructed by the hilltop 25. For instance, as illustrated in FIG. 6, the object O is visible to the camera at 20a, a point in section BC of the road 50 upstream of the hilltop 25, and invisible to the camera at 20b, a point in section CD of the road 50 downstream of the hilltop 25. The object O may become visible again to the camera as it travels further down the road 50 and/or as the autonomous vehicle 10 travels along the road 50 in a same direction as the object O.

FIG. 6 illustrates an example process for determining the occlusion based on the map information and the environment and at least one camera parameter of the camera for obtaining the image described in 402, thereby transferring the occlusion information (e.g., location of the occlusion) to the image (substantially) in real-time so that further analysis of the object according to one or more operations in the process 400. For instance, the detected occlusion (e.g., the hilltop 25) may be marked in the image as, e.g., a line that indicates the position of the occlusion relative to other components (e.g., the object O as illustrated in FIG. 6) represented in the image. However, this example process is provided for illustration purposes and not intended to be limiting. The occlusion may be detected based on the map information and the camera parameter(s) based on a different algorithm so that the occlusion information may be transferred to the image for further analysis according to one or more operations of the process 400.

Returning to FIG. 4, at 406, the computer may identify the object (e.g., the object O as illustrated in FIG. 6) represented in the image. In some embodiments, the computer may identify the object represented in the image based on an object detection model. Example object detection model may include an image segmentation algorithm, a machine learning model, etc. In some embodiments, the computer may identify the object represented in the image by determining a bounding box that encloses a representation of the object in the image. For example, the computer may enclose the identified object using a bounding box. Sec, e.g., the bounding box 540 in FIG. 5A that encloses a representation of the object 520 in the image 500A.

At 408, the computer may determine a confidence score relating to the object represented in the image. As used herein, the confidence score indicates a likelihood a representation of the object in the image is impacted by the occlusion. In some embodiments, the occlusion may include a change in the contour of the road in an occlusion direction. As used herein, a contour direction refers to the direction along which a change in the contour may impact the visibility of the object from the camera's perspective. For instance, for an occlusion including a hilltop 25 as illustrated in FIG. 6, the occlusion direction is a vertical direction that is perpendicular to the horizontal plane. As another example, for an occlusion including a hilltop marked as the line 510 in the image 500A in FIG. 5A, the occlusion direction is a vertical direction that is perpendicular to the horizontal plane, as illustrated by an arrow 550 in the image 500A in FIG. 5A and also in the image 500B in FIG. 5B.

In some embodiments, the computer may determine the confidence score relating to the object by determining a distance between a boundary of the bounding box and the occlusion marked in the image along the occlusion direction. For illustration purposes and not intended to be limiting, the bounding box may have the shape of a rectangle or a square. For example, with reference to FIG. 5A, the computer may determine the confidence score relating to the object by determining the distance d between the bounding box 540 and the occlusion marked as the line 510 in the image 500A along the occlusion direction 550. In some embodiments, the computer may determine the distance between the bounding box and the occlusion marked in the image along the occlusion direction by determining a pixel count of pixels along a line connecting a reference point of the bounding box and the occlusion marked in the image along the occlusion direction. For example, the reference point is a midpoint of the bottom boundary of the bounding box, and the line may pass through the reference point of the bounding box. Sec, e.g., line 560 that connects the bottom boundary of the bounding box 540 and the occlusion marked in the image as line 510 along the occlusion direction 550 and passes through the midpoint of the bottom boundary of the bounding box 540 in FIG. 5A. As another example, the reference point of the bounding box is a center of the bounding box, e.g., a 2D center of the bounding box 540 as illustrated in FIG. 5A.

In some embodiments, the computer may determine a candidate distance between multiple reference points of the bounding box (e.g., points along a horizontal line 570 midway between the top boundary and the bottom boundary of the bounding box as illustrated in FIG. 5A) and the occlusion marked in the image along the occlusion direction at each of multiple reference points (including the center of the bounding box or not) and determine the distance for a confidence score determination based on the candidate distances. For instance, the computer may determine an average value of the candidate distances and use the average value as the distance for the confidence score determination. As another example, the computer may designate one of the candidate distances (e.g., a minimum candidate distance, the maximum candidate distance, etc.) as the distance for the confidence score determination. As a further example, the computer may determine a candidate confidence score based on each of one or more of the candidate distances, and determine the confidence score based on the candidate confidence scores. For example, the computer may designate an average value of the candidate confidence scores or one of the candidate confidence scores as the confidence score.

In some embodiments, the occlusion direction is a vertical direction substantially perpendicular to a plane of the road or to a horizontal plane. See, e.g., the occlusion direction 550 as illustrated in FIG. 5A and FIG. 5B. In some embodiments, the occlusion direction is a lateral direction substantially in or parallel to a plane of the road or to the horizontal plane.

In some embodiments, the computer may determine the confidence score based on the distance between a boundary of the bounding box and the occlusion marked in the image along the occlusion direction. A high confidence score may indicate that the object is in a close vicinity of the occlusion, and accordingly the likelihood that the representation of the object in the image is impacted by the occlusion is high, which in turn may suggest that the likelihood that the representation of the object is inaccurate is high. Conversely, a low confidence score may indicate that the object is sufficiently far away the occlusion, and accordingly the likelihood that the representation of the object in the image is impacted by the occlusion is low, which in turn may suggest that the likelihood that the representation of the object is inaccurate is low.

With reference to the hierarchical configuration of the vehicle ecosystem 100 as illustrated in FIG. 1, various parts of the vehicle ecosystem 100, the in-vehicle control computer 150 may determine the confidence score within 50 milliseconds, and then use the confidence score in downstream operations including, e.g., the determination of an operation algorithm of the autonomous vehicle in 410 described herein.

At 410, the computer may determine an operation algorithm for operating the autonomous vehicle based on the confidence score. In some embodiments, in response to determining that the confidence score relating to the object is below a confidence score threshold, indicating that the object is sufficiently far away the occlusion and the likelihood that the representation of the object in the image is impacted by the occlusion is low, the computer may determine to maintain the operation algorithm currently in effect.

In some embodiments, in response to determining that the confidence score exceeds a confidence score threshold, indicating that the object is in a close vicinity of the occlusion and the likelihood that the representation of the object in the image is impacted by the occlusion is high, the computer may adjust the operation algorithm currently in effect. For instance, in response to determining that the confidence score exceeds a confidence score threshold, the computer may cause the autonomous vehicle to decelerate; if the autonomous vehicle travels at a first speed when the autonomous vehicle operates according to the operation algorithm currently in effect and travels at a second speed when operating according to the adjusted operation algorithm, the first speed may be greater than the second speed.

In some embodiments, in response to determining that the confidence score exceeds a confidence score threshold, the computer may use a different algorithm (e.g., a different object detection model) for monitoring the object in the vicinity of the autonomous vehicle to compensate for the impact on the image of the environment including a representation of the object the camera (e.g., the camera 216) can acquire. For example, the computer may retrieve an image of the environment of the autonomous vehicle obtained at a first time point and an image of the environment of the autonomous vehicle obtained at a second time point different from the first time point; the computer may identify the object in the image using a first object detection model, and in response to determining that the confidence score exceeds a confidence score threshold, the computer may select a second object detection model for identifying the object in the second image, in which the second object detection model is different from the first object detection model. As another example, instead of relying on the image of the environment including a representation of the object, the computer may involve a prediction model to predict the behavior of the object in the environment of the autonomous vehicle based on prior data (e.g., speed, trajectory, etc.), including operation parameters of the object in the environment, and determine an operation algorithm of the autonomous vehicle based on the prediction.

In some embodiments, the computer may obtain, using the camera, a plurality of images of the environment at a plurality of time points, track the object based on the plurality of images; and determine the operation algorithm based further on the tracking of the object.

At 412, the computer may cause the autonomous vehicle to operate based on the operation algorithm.

It is understood that the description of the present disclosure is provided with reference to an autonomous vehicle or a semi-truck for illustration purposes and not intended to be limiting. The present technology is applicable to assisted driving in operating a conventional vehicle, an electric vehicle, a hybrid vehicle. The vehicle may include a passenger car, a van, a truck, a bus, etc.

Some example technical solutions implemented below.

1. A method of for operating an autonomous vehicle, comprising: obtaining, by a camera associated with an autonomous vehicle, an image of an environment of the autonomous vehicle, the environment including a road on which the autonomous vehicle is operating and an occlusion on the road; identifying, by at least one processor associated with the autonomous vehicle, the occlusion in the image based on map information of the environment and at least one camera parameter of the camera for obtaining the image; identifying, by the at least one processor, an object represented in the image; determining, by the at least one processor, a confidence score relating to the object, wherein the confidence score indicates a likelihood a representation of the object in the image is impacted by the occlusion;

determining an operation algorithm based on the confidence score; and causing the autonomous vehicle to operate based on the operation algorithm.

2. The method of any one of the solutions herein, wherein the at least one camera parameter of the camera comprises at least one of an intrinsic camera parameter of the camera or an extrinsic camera parameter of the camera.

3. The method of any one of the solutions herein, wherein the at least one camera parameter of the camera comprises at least one of a height of the camera or a tilt angle of the camera.

4. The method of any one of the solutions herein, wherein the image comprises a reference line relating to the at least one parameter of the camera.

5. The method of any one of the solutions herein, wherein the map information comprises a contour of the road, the identifying the occlusion in the image based on map information of the environment and at least one parameter of the camera comprises: at each of a plurality of points along the reference line, determining a distance between the point on the reference line and a corresponding location on the contour of the road; and identifying a location of the occlusion based on the distances.

6. The method of any one of the solutions herein, wherein the identifying the occlusion in the image based on map information of the environment and at least one parameter of the camera comprises: marking the occlusion in the image.

7. The method of any one of the solutions herein, wherein: the map information comprises a contour of the road, the occlusion comprises a change in the contour of the road in an occlusion direction, the identifying an object represented in the image comprises determining a bounding box that encloses a representation of the object in the image; and the determining a confidence score relating to the object comprises: determining a distance between the bounding box and the occlusion marked in the image along the occlusion direction; and determining the confidence score based on the distance.

8. The method of any one of the solutions herein, wherein the determining a distance between the bounding box and the occlusion marked in the image along the occlusion direction comprises: identifying a reference point of the bounding box; and determining a pixel count of pixels along a line connecting the reference point of the bounding box and the occlusion marked in the image along the occlusion direction.

9. The method of any one of the solutions herein, wherein the reference point of the bounding box is a center of the bounding box.

10. The method of any one of the solutions herein, wherein: the occlusion direction is a vertical direction substantially perpendicular to a plane of the road.

11. The method of any one of the solutions herein, wherein: the occlusion direction is a lateral direction substantially in or parallel to a plane of the road.

12. The method of any one of the solutions herein, wherein the determining an operation algorithm based on the confidence score comprises: in response to determining that the confidence score relating to the object is below a confidence score threshold, maintaining the operation algorithm currently in effect.

13. The method of any one of the solutions herein, wherein the determining the operation algorithm based on the confidence score comprises: in response to determining that the confidence score exceeds a confidence score threshold, adjusting the operation algorithm currently in effect.

14. The method of any one of the solutions herein, wherein: the autonomous vehicle travels at a first speed when the autonomous vehicle operates according to the operation algorithm currently in effect and travels at a second speed when operating according to the adjusted operation algorithm, and the first speed is greater than the second speed.

15. The method of any one of the solutions herein, wherein the determining an operation algorithm based on the confidence score comprises: selecting, based on the confidence score, an object detection model used for identifying the object in the image.

16. The method of any one of the solutions herein, further comprising obtaining, using the camera, a second image of the environment at a second time point, wherein: the image is obtained at a first time point different from the second time point, the identifying the object in the image is performed based on a first object detection model, and in response to determining that the confidence score exceeds a confidence score threshold, the determining the operation algorithm comprises selecting a second object detection model for identifying the object in the second image, the second object detection model being different from the first object detection model.

17. The method of any one of the solutions herein, further comprising: obtaining, using the camera, a plurality of images of the environment at a plurality of time points; tracking the object based on the plurality of images; and determining the operation algorithm based further on the tracking of the object.

18. An apparatus, comprising at least one processor and at least one memory including computer program code which, when executed by the at least one processor, cause the apparatus to perform any one of the solutions herein.

19. The apparatus of any one of the solutions herein, wherein the camera is attached to a top surface of the autonomous vehicle.

20. The apparatus of any one of the solutions herein, wherein at least one of the at least one processor is installed in the autonomous vehicle.

21. An autonomous vehicle, comprising at least one camera, at least one processor, and memory that includes computer program code which, when executed by the at least one processor, cause the autonomous vehicle to operate according to any one of the solutions herein.

22. The autonomous vehicle of any one of the solutions herein, wherein at least one of the at least one camera is attached to a top surface of the autonomous vehicle.

23. A non-transitory computer readable program storage medium having code stored thereon, the code, when executed by a processor, causing the processor to implement to effectuate any one of the solutions herein.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of operating an autonomous vehicle, comprising:

obtaining, by a camera associated with an autonomous vehicle, a first image of an environment of the autonomous vehicle, the environment including a road on which the autonomous vehicle is operating and an occlusion on the road;

identifying, by at least one processor, associated with the autonomous vehicle, the occlusion in the first image based on map information of the environment and at least one camera parameter of the camera for obtaining the first image;

identifying, by the at least one processor, an object represented in the first image;

determining, by the at least one processor, a confidence score relating to the object, wherein the confidence score indicates a likelihood a representation of the object in the first image is impacted by the occlusion;

determining an operation algorithm based on the confidence score; and causing the autonomous vehicle to operate based on the operation algorithm;

wherein:

the at least one camera parameter of the camera comprises at least one of a height of the camera or a tilt angle of the camera;

the first image comprises a reference line relating to the at least one camera parameter;

the map information comprises a contour of the road, and identifying the occlusion in the first image based on the map information of the environment and at least one parameter of the camera comprises:

at each of a plurality of points along the reference line, determining a distance between the point on the reference line and a corresponding location on the contour of the road; and identifying a location of the occlusion based on the distances.

2. The method of claim 1, wherein the at least one camera parameter of the camera comprises at least one of an intrinsic camera parameter of the camera or an extrinsic camera parameter of the camera.

3. The method of claim 1, wherein the identifying the occlusion in the first image based on the map information of the environment and at least one parameter of the camera comprises:

marking the occlusion in the first image.

4. The method of claim 3, wherein:

the map information comprises a contour of the road, the occlusion comprises a change in the contour of the road in an occlusion direction, identifying the object represented in the first image comprises determining a bounding box that encloses a representation of the object in the first image; and determining the confidence score relating to the object comprises:

determining a distance between the bounding box and the occlusion marked in the first image along the occlusion direction; and determining the confidence score based on the distance.

5. The method of claim 4, wherein determining the distance between the bounding box and the occlusion marked in the first image along the occlusion direction comprises:

identifying a reference point of the bounding box; and determining a pixel count of pixels along a line connecting the reference point of the bounding box and the occlusion marked in the first image along the occlusion direction.

6. The method of claim 5, wherein the reference point of the bounding box is a center of the bounding box.

7. The method of claim 5, wherein:

the occlusion direction is a vertical direction substantially perpendicular to a plane of the road.

8. The method of claim 5, wherein:

the occlusion direction is a lateral direction substantially in or parallel to a plane of the road.

9. The method of claim 1, wherein determining the operation algorithm based on the confidence score comprises:

in response to determining that the confidence score relating to the object is below a confidence score threshold, maintaining the operation algorithm currently in effect.

10. The method of claim 1, wherein determining the operation algorithm based on the confidence score comprises:

in response to determining that the confidence score exceeds a confidence score threshold, adjusting the operation algorithm currently in effect.

11. The method of claim 10, wherein:

the autonomous vehicle travels at a first speed when the autonomous vehicle operates according to the operation algorithm currently in effect and travels at a second speed when operating according to the adjusted operation algorithm, and the first speed is greater than the second speed.

12. The method of claim 1, wherein determining the operation algorithm based on the confidence score comprises:

selecting, based on the confidence score, an object detection model used for identifying the object in the first image.

13. The method of claim 1, further comprising obtaining, using the camera, a second image of the environment at a second time point, wherein:

the first image is obtained at a first time point different from the second time point, identifying the object in the first image is performed based on a first object detection model, and in response to determining that the confidence score exceeds a confidence score threshold, determining the operation algorithm comprises selecting a second object detection model for identifying the object in the second image, the second object detection model being different from the first object detection model.

14. The method of claim 1, further comprising:

obtaining, using the camera, a plurality of images of the environment at a plurality of time points;

tracking the object based on the plurality of images; and determining the operation algorithm based further on the tracking of the object.

15. An apparatus, comprising:

at least one processor;

and at least one memory including computer program code which, when executed by the at least one processor, cause apparatus to perform operations comprising:

obtaining, from a camera associated with an autonomous vehicle, a first image of an environment of the autonomous vehicle, the environment including a road on which the autonomous vehicle is operating and an occlusion on the road;

identifying, by the at least one processor, the occlusion in the first image based on map information of the environment and at least one camera parameter of the camera for obtaining the first image;

identifying, by the at least one processor, an object represented in the first image;

determining, by the at least one processor, a confidence score relating to the object, wherein the confidence score indicates a likelihood a representation of the object in the first image is impacted by the occlusion;

determining, by the at least one processor, an operation algorithm based on the confidence score; and causing the autonomous vehicle to operate based on the operation algorithm;

wherein:

the at least one camera parameter of the camera comprises at least one of a height of the camera or a tilt angle of the camera;

the first image comprises a reference line relating to the at least one camera parameter;

the map information comprises a contour of the road, and identifying the occlusion in the first image based on the map information of the environment and at least one parameter of the camera comprises:

at each of a plurality of points along the reference line, determining a distance between the point on the reference line and a corresponding location on the contour of the road; and identifying a location of the occlusion based on the distances.

16. The apparatus of claim 15, wherein the camera is attached to a top surface of the autonomous vehicle.

17. The apparatus of claim 15, wherein at least one of the at least one processor is installed in the autonomous vehicle.

18. A non-transitory computer readable program storage medium having code stored thereon, the code, when executed by at least one processor, causing the at least one processor to perform operations comprising:

obtaining, from a camera associated with an autonomous vehicle, a first image of an environment of the autonomous vehicle, the environment including a road on which the autonomous vehicle is operating and an occlusion on the road;

identifying, by the at least one processor, the occlusion in the first image based on map information of the environment and at least one camera parameter of the camera for obtaining the first image;

identifying, by the at least one processor, an object represented in the first image;

determining, by the at least one processor, a confidence score relating to the object, wherein the confidence score indicates a likelihood a representation of the object in the first image is impacted by the occlusion;

determining, by the at least one processor, an operation algorithm based on the confidence score; and causing the autonomous vehicle to operate based on the operation algorithm;

wherein:

the at least one camera parameter of the camera comprises at least one of a height of the camera or a tilt angle of the camera;

the first image comprises a reference line relating to the at least one camera parameter;

the map information comprises a contour of the road, and identifying the occlusion in the first image based on the map information of the environment and at least one parameter of the camera comprises:

at each of a plurality of points along the reference line, determining a distance between the point on the reference line and a corresponding location on the contour of the road; and identifying a location of the occlusion based on the distances.

19. The non-transitory computer readable program storage medium of claim 18, wherein identifying the occlusion in the first image based on the map information of the environment and at least one parameter of the camera comprises:

marking the occlusion in the first image.

20. The non-transitory computer readable program storage medium of claim 19, wherein:

the map information comprises a contour of the road, the occlusion comprises a change in the contour of the road in an occlusion direction, identifying the object represented in the first image comprises determining a bounding box that encloses a representation of the object in the first image; and determining the confidence score relating to the object comprises:

determining a distance between the bounding box and the occlusion marked in the first image along the occlusion direction; and determining the confidence score based on the distance.

* * * * *